(12) United States Patent
Tanaka

(10) Patent No.: US 9,004,043 B2
(45) Date of Patent: Apr. 14, 2015

(54) CONTROL DEVICE FOR INTERNAL COMBUSTION ENGINE

(75) Inventor: Satoru Tanaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 34 days.

(21) Appl. No.: 13/977,847

(22) PCT Filed: Feb. 1, 2011

(86) PCT No.: PCT/JP2011/052041
§ 371 (c)(1),
(2), (4) Date: Jul. 1, 2013

(87) PCT Pub. No.: WO2012/104998
PCT Pub. Date: Aug. 9, 2012

(65) Prior Publication Data
US 2013/0306026 A1 Nov. 21, 2013

(51) Int. Cl.
*F02D 41/02* (2006.01)
*F02D 13/02* (2006.01)
*F02D 41/00* (2006.01)
*F02D 41/14* (2006.01)
*F02B 37/18* (2006.01)

(52) U.S. Cl.
CPC ............ *F02D 13/02* (2013.01); *F02D 41/0002* (2013.01); *Y02T 10/42* (2013.01); *F02D 41/1406* (2013.01); *F02D 41/0007* (2013.01); *F02D 2041/001* (2013.01); *F02D 2041/002* (2013.01); *F02D 2200/0402* (2013.01); *F02D 2200/0406* (2013.01); *F02B 37/18* (2013.01)

(58) Field of Classification Search
CPC ............ F02D 41/0002; F02D 41/0007; F02D 13/0207; F02D 13/0223; F02D 2041/001
USPC .......... 123/347, 348, 345, 346, 90.15, 90.11, 123/399, 395; 701/101, 102, 103; 73/114.32, 114.33, 114.37
See application file for complete search history.

(56) References Cited

U.S. PATENT DOCUMENTS

| 6,276,316 | B1 * | 8/2001 | Arai et al. ................. 123/90.11 |
| 6,390,063 | B1 * | 5/2002 | Obata et al. .................. 123/399 |
| 2002/0124831 | A1 * | 9/2002 | Kondo .................... 123/406.47 |
| 2003/0075151 | A1 | 4/2003 | Machida et al. |
| 2004/0182346 | A1 | 9/2004 | Eiraku |

(Continued)

FOREIGN PATENT DOCUMENTS

| JP | A-2001-159341 | 6/2001 |
| JP | A-2003-184587 | 7/2003 |

(Continued)

*Primary Examiner* — Mahmoud Gimie
(74) *Attorney, Agent, or Firm* — Oliff PLC

(57) ABSTRACT

A control device calculates a maximum amount of increase in an intake pipe pressure in a Δt obtained by moving a throttle to an opening side at a maximum speed, and calculates a maximum amount of decrease in an intake pipe pressure in the Δt obtained by moving the throttle to a closing side at a maximum speed. Then, command values for each of a VVT and a WGV are determined such that an amount of change in an intake pipe pressure in the Δt required to achieve a target intake air amount falls within a range from the maximum amount of decrease to the maximum amount of increase. Then, a target opening for the throttle for a purpose of achieving the target intake air amount is calculated on the basis of command values that have been determined for the VVT and the WGV.

3 Claims, 5 Drawing Sheets

(56) References Cited

U.S. PATENT DOCUMENTS

| | | |
|---|---|---|
| 2006/0248889 A1 | 11/2006 | Sagisaka et al. |
| 2010/0162993 A1* | 7/2010 | Yoshikawa et al. ........... 123/337 |
| 2011/0144885 A1 | 6/2011 | Ohtsuka et al. |

FOREIGN PATENT DOCUMENTS

| | | |
|---|---|---|
| JP | A-2004-245082 | 9/2004 |
| JP | A-2007-009877 | 1/2007 |
| JP | A-2007-056842 | 3/2007 |
| JP | A-2008-008155 | 1/2008 |
| JP | A-2008-297929 | 12/2008 |
| JP | A-2009-068402 | 4/2009 |
| JP | A-2010-053705 | 3/2010 |
| JP | A-2010-116798 | 5/2010 |

* cited by examiner

CONTROL DEVICE FOR INTERNAL COMBUSTION ENGINE

TECHNICAL FIELD

The present invention relates to a control device for an internal combustion engine and particularly relates to a control device for an internal combustion engine including a throttle that is disposed in an intake passage and a plurality of actuators of which the operating states affect a relationship between an intake pipe pressure and an intake air amount.

BACKGROUND ART

A number of actuators are provided in an internal combustion engine for a vehicle. A control device for an internal combustion engine controls the internal combustion engine by performing coordinated manipulation of those actuators. Control relating to the plurality of actuators includes intake air amount control. Controlling an intake air amount is performed mainly by a throttle disposed in an intake passage. However, when an intake valve is provided with a variable valve timing mechanism (hereinafter, VVT), the intake air amount is affected by not only an opening of the throttle but also an operating state of the VVT. Therefore, as described in JP-A No. 2004-245082, for example, conventional control devices for an internal combustion engine have identified each operable range of the throttle and the VVT and have determined optimum actuator operating amounts for realizing a target intake air amount in the range.

However, the VVT is not the only actuator other than the throttle to be taken into account in controlling of an intake air amount. In order to accurately control the intake air amount by the throttle, it is better to take into account all the actuators of which the operating states affect a relationship between an intake air amount and an intake pipe pressure. Such actuators include a waste gate valve (hereinafter, WGV), a variable lift amount mechanism that varies a lift amount of the intake valve, and so on. Application to these actuators is not mentioned in the above patent document.

In addition, it is conceivable to perform adaptation of command values for all the actuators including the throttle for each operational condition including an engine speed and an intake air amount to map the command values. However, in order to accurately control the intake air amount, it is necessary to perform adaptation for the actuator command values not only in steady states but also in transient states. Performing adaptation in transient states is difficult and requires significant man-hours. Therefore, it is far from realistic to map the command values for all the actuators.

CITATION LIST

Patent Document

Patent Document 1: JP-A No. 2004-245082
Patent Document 2: JP-A No. 2009-068402
Patent Document 3: JP-A No. 2010-053705
Patent Document 4: JP-A No. 2008-008155
Patent Document 5: JP-A No. 2003-184587
Patent Document 6: JP-A No. 2001-159341

SUMMARY OF INVENTION

The present invention has an object to control an intake air amount accurately by means of a throttle even where a plurality of actuators of which the operating states affect a relationship between an intake pipe pressure and an intake air amount are provided. In order to achieve such an object, the present invention provides a control device for an internal combustion engine as follows.

First, a control device for an internal combustion engine provided by the present invention determines a target intake air amount in a predetermined time step (hereinafter, Δt). Next, the control device calculates a maximum amount of increase in a intake pipe pressure in the Δt achieved by manipulating a throttle to an opening side at a maximum speed and a maximum amount of decrease in an intake pipe pressure in the Δt achieved by manipulating the throttle to an closing side at a maximum speed. By use of a relational expression established between a flow rate of air passing through the throttle (hereinafter, throttle flow rate), a flow rate of air passing through an intake valve (hereinafter, intake valve flow rate), and an amount of change in an intake pipe pressure and a relational expression established between an opening of the throttle and a throttle flow rate, both the maximum amount of increase and maximum amount of decrease in the intake pipe pressure are calculated from a current intake pipe pressure and a current intake valve flow rate. Next, the control device determines, by use of a relational expression established between an intake pipe pressure, an intake valve flow rate, and operating states of the plurality of actuators and a relational expression established between an intake valve flow rate and an intake air amount, a command value for each of the plurality of actuators so that an amount of change in the intake pipe pressure in the Δt that is required to achieve the target intake air amount falls within a range from the maximum amount of decrease to the maximum amount of increase. Then, the control device calculates a target opening of the throttle for a purpose of achieving the target intake air amount under the determined actuator command value. According to this, excessive operations of actuators other than the throttle are limited and thereby the amount of change in the intake pipe pressure required to achieve the target intake air amount is confined within a range where the throttle is operable. This makes it possible to control accurately the intake air amount by means of the throttle.

In addition, there are preferred embodiments of a method for determining the actuator command value. According to one preferred embodiment thereof, the control device prepares in advance a plurality of command value candidates for each operational condition of the internal combustion engine and selects the actuator command value to be determined from the plurality of command value candidates. According to another preferred embodiment, the control device prepares in advance an optimum command value for each operational condition of the internal combustion engine and sets the optimum command value as the actuator command value when the amount of change in the intake pipe pressure realized with the optimum command value is within the range from the maximum amount of decrease to the maximum amount of increase. However, the control device sets a value specified with the maximum amount of decrease as the actuator command value when the amount of change in the intake pipe pressure realized with the optimum command value exceeds the maximum amount of decrease and sets a value specified with the maximum amount of increase as the actuator command value when the amount of change in the intake pipe pressure realized with the optimum command value exceeds the maximum amount of increase.

DESCRIPTION OF EMBODIMENT

First Embodiment

A first embodiment of the present invention will now be described with reference to the accompanying drawings.

A control device for an internal combustion engine of the present embodiment is intended for an internal combustion engine of which the torque is controlled by controlling an intake air amount by the operation of a throttle. The internal combustion engine controlled by the present control device is an internal combustion engine with a turbocharger, which is provided with a VVT and a WGV that are actuators of which the operating states affect a relationship between an intake pipe pressure and an intake air amount.

Figure 1:
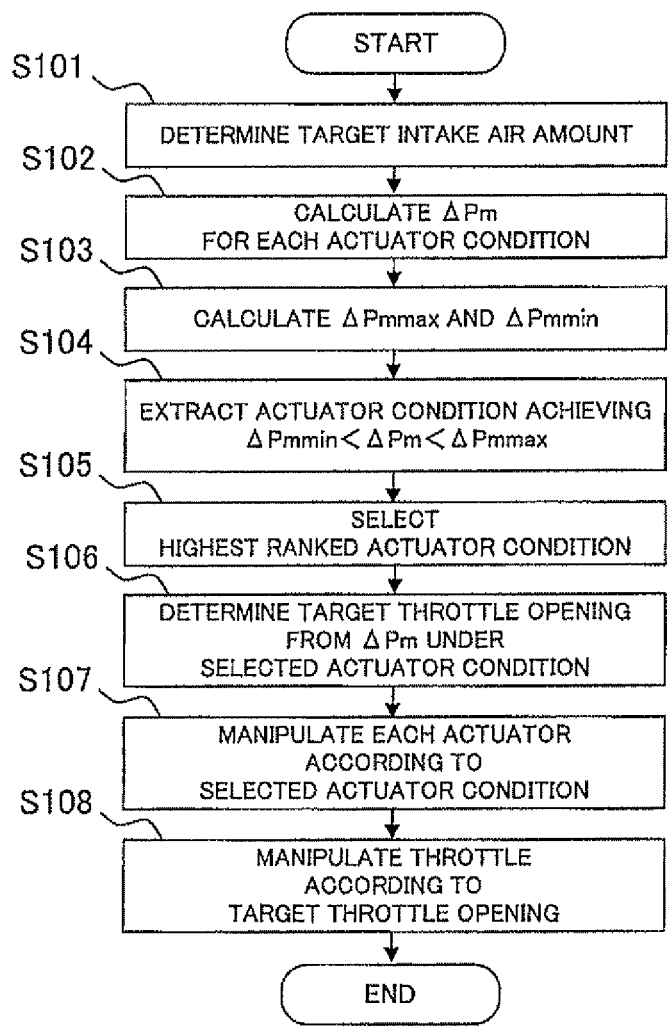
FIG. 1 is a flowchart showing a procedure of an intake air amount control executed by a control device in a first embodiment of the present invention.

The present control device calculates a load required for the internal combustion engine based on a driver's accelerator operation amount and determines a target intake air amount to achieve the required load. Determination of the target intake air amount is performed every predetermined time step $\Delta t$. Then, an opening of the throttle that is necessary to achieve the target intake air amount is determined together with respective command values for the VVT and the WGV. In other words, the present control device performs coordinated manipulation of all the actuators relating to an intake air amount instead of manipulating the throttle independently of the VVT and the WGV. A procedure of an intake air amount control executed by the present control device will now be described with reference to the flowchart in FIG. 1 as follows.

First, in step S101, the present control device determines a target intake air amount in the $\Delta t$ according to the load required for the internal combustion engine.

In the following step S102, the present control device calculates the amount of change in the intake pipe pressure that is required to achieve the target intake air amount for each actuator condition. The actuator condition is a condition determined by an operating state of the VVT and an operating state of the WGV. The present control device prepares in advance a plurality of combinations of a command value candidate for the VVT and a command value candidate for the WGV for each operational condition of the internal combustion engine. Each combination of the command value candidate for the VVT and the command value candidate for the WGV corresponds to the actuator condition. Each actuator condition is ranked from a viewpoint of fuel economy performance, exhaust gas performance, drivability, and so on.

Calculation of the amount of change in the intake pipe pressure is performed by use of the following equation 1 established between an intake pipe pressure, an intake valve flow rate, and an actuator condition. In Equation 1, "mc" denotes an intake valve flow rate and "Pm" denotes an intake pipe pressure. "a" and "b" denote coefficients, which are expressed respectively as a function of an engine speed "ne", a command value "VVT" of the VVT, and a command value "WGV" of the WGV.

$$mc = a(ne, VVT, WGV) * Pm - b(ne, VVT, WGV) \quad \text{Equation 1}$$

Further, the intake valve flow rate "mc" is expressed as a function of an intake air amount "KL" as shown in the following Equation 2.

$$mc = mc(KL) \quad \text{Equation 2}$$

Therefore, when a target intake air amount "KLref" is given, a target intake pipe ressure "Pmref(t+$\Delta t$)" in the $\Delta t$ is calculated according to the following Equation 3.

$$Pmref(t+\Delta t) = (mc(KLref) + b(ne, VVT, WGV))/a(ne, VVT, WGV) \quad \text{Equation 3}$$

An amount "$\Delta Pm$" of change in the intake pipe pressure is the difference between the target intake pipe pressure "Pmref(t+$\Delta t$)" and a current intake pipe pressure "Pm(t)" and therefore is calculated according to the following Equation 4, $$\Delta Pm = (mc(KLref) + b(ne, VVT, WGV))/a(ne, VVT, WGV) - Pm(t) \quad \text{Equation 4}$$

Figure 2:
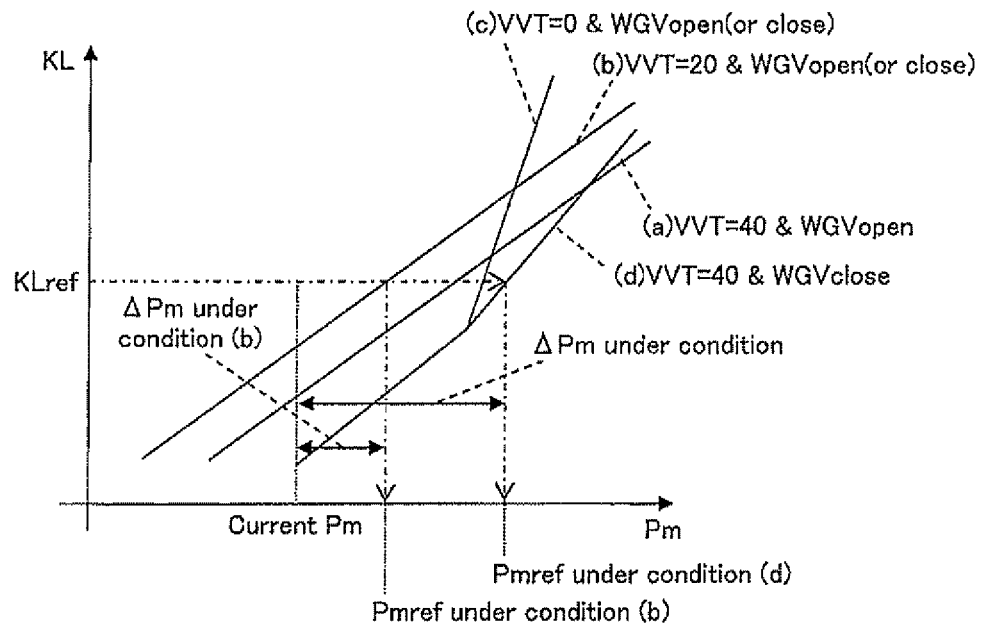
FIG. 2 is a diagram showing an image of calculating am according to the first embodiment of the present invention.

The present control device calculates the amount of change in the intake pipe pressure for each actuator condition according to Equation 4. FIG. 2 illustrates four actuator conditions (a), (b), (c), and (d) and represents relationships between an intake pipe pressure and an intake air amount under the respective actuator conditions. Further, FIG. 2 shows Pmref and $\Delta Pm$ calculated in condition (b) and Pmref and $\Delta Pm$ calculated in condition (d) comparatively. As can be seen from this figure, the amount of change in the intake pipe pressure required to achieve the target intake air amount varies depending on actuator conditions.

In the following step S103, the present control device calculates a maximum amount of increase in the intake pipe pressure in the $\Delta t$ that is achieved when the throttle is manipulated to an opening side at a maximum speed and calculates a maximum amount of decrease in the intake pipe pressure in the $\Delta t$ that is achieved when the throttle is manipulated to an closing side at a maximum speed. These calculations are performed by use of the following Equation 5 established between a throttle flow rate, an intake valve flow rate, and an amount of change in an intake pipe pressure. In Equation 5, "$\kappa$" denotes a specific heat ratio, "R" denotes a gas constant, "T" denotes a throttle upstream temperature, "Vm" denotes an intake pipe volume, "mt" denotes a throttle flow rate, and "mc" denotes an intake valve flow rate. As shown in the equation, the throttle flow rate "mt" is expressed as a function of a throttle opening "TA", an intake pipe pressure "Pm", and a throttle upstream pressure "P".

$$\Delta Pm = \kappa * R * T * \Delta t / Vm * (mt(TA(t+\Delta t), Pm(t), P) - mc(t)) \quad \text{Equation 5}$$

By using the above Equation 5, the maximum amount "$\Delta Pmmax$" of increase in the intake pipe pressure can be calculated according to the following Equation 6. In Equation 6, "$\Delta TA$" denotes a maximum amount of change in the throttle opening per the $\Delta t$.

$$\Delta Pmmax = \kappa * R * T * \Delta t / Vm * (mt(TA(t) + \Delta TA, Pm(t), P) - mc(t)) \quad \text{Equation 6}$$

Similarly, the maximum amount "ΔPmmin" of decrease in the intake pipe pressure can be calculated according to the following Equation 7.

$$\Delta Pmmin = \kappa * R * T * \Delta t / Vm * (mt(TA(t) - \Delta TA, Pm(t), P) - mc(t))$$ Equation 7

The maximum amount "ΔPmmax" of increase in the intake pipe pressure is an upper limit of the amount of change in the intake pipe pressure that is available within operable range of the throttle, and meanwhile the maximum amount "ΔPmmin" of decrease is a lower limit of the amount of change in the intake pipe pressure. Thus, when the amount "ΔPm" of change in the intake pipe pressure under a certain actuator condition, which is included among the amounts "ΔPm" of change in the intake pipe pressure under the respective actuator conditions calculated in step S102, is within a range from the maximum amount "ΔPmmin" of decrease to the maximum amount "ΔPmmax" of increase, it is deemed possible to achieve the target intake air amount under the certain actuator condition.

Therefore, in the following step S104, the present control device determines whether a conditional equation "ΔPmmin<ΔPm<ΔPmmax" is satisfied regarding the amounts "ΔPm" of change in the intake pipe pressure under the respective actuator conditions and extracts an actuator condition under which the conditional equation is satisfied. Then, in the following step S105, the present control device selects the highest ranked actuator condition among the actuator conditions extracted in step S104.

Figure 3:
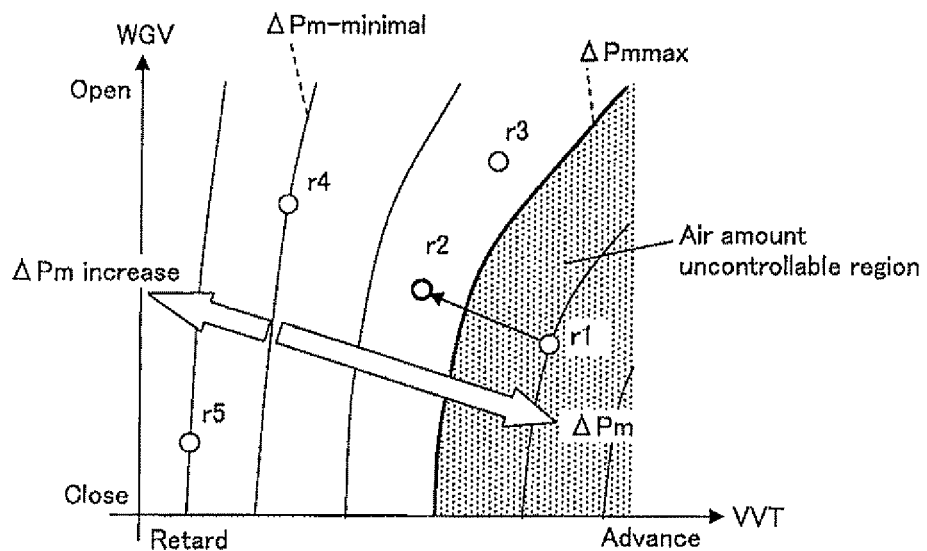
FIG. 3 is a diagram explaining a method of selecting an actuator condition in the first embodiment of the present invention.
Figure 4:
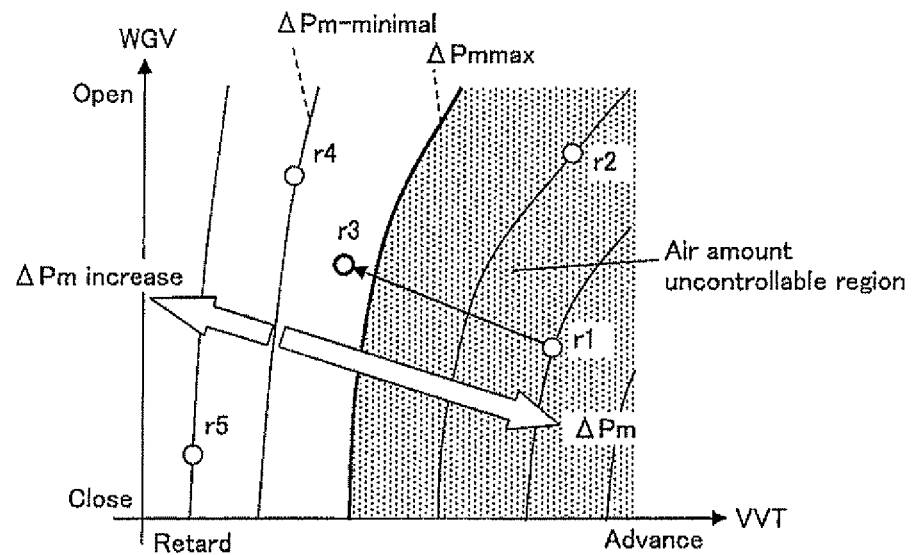
FIG. 4 is a diagram explaining a method of selecting an actuator condition in the first embodiment of the present invention.
Figure 5:
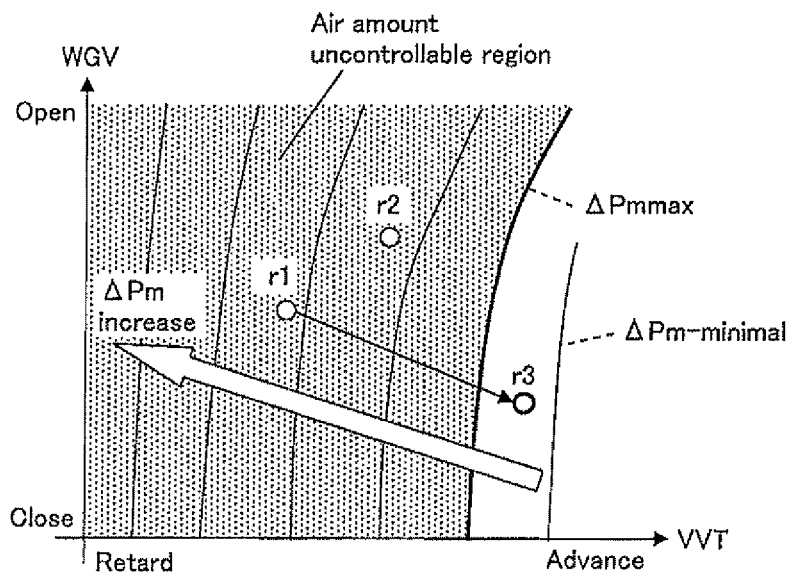
FIG. 5 is a diagram explaining a method of selecting an actuator condition in the first embodiment of the present invention.

Here, a method of selecting an actuator condition by the present control device will now be explained with drawings. Each graph shown in FIGS. 3, 4 and 5 is a contour plot of ΔPm where the vertical axis shows a command value of the WGV and the horizontal axis shows a command value of the VVT. Each graph depicts a contour plot of ΔPm at the time of acceleration. A plurality of white circles shown in the graph are operating points corresponding to the respective actuator conditions. Since the target air amount is increased at the time of acceleration, the amount of change in the intake pipe pressure "ΔPm" has a positive value. Therefore, a problem may be caused depending on a relationship between the upper limit line of ΔPmmax and each operating point. The line of ΔPm-minimal in the figure is a line connecting minimal values of ΔPm and is not intended to be the lower limit line of ΔPmmin.

The graph shown in FIG. 3 depicts a contour plot of ΔPm corresponding to the case where the target air amount is relatively slowly changing at the time of acceleration. The right side region from the line of ΔPmmax in the figure is a region where intake air amount control by the throttle is impossible (air amount uncontrollable region). In the figure, five operating points from r1 to r5 are shown. Each operating point number represents a rank, and the operating point r1 is the highest-ranked operating point. Thus, if respective command values for the VVT and WGV are determined in the course of nature, the actuator condition corresponding to the operating point r1 is selected. However, in the case of the figure, the operating point r1 is within the air amount uncontrollable region, and the conditional equation "ΔPmmin<ΔPm<ΔPmmax" is not satisfied at the operating point r1. Therefore, in this case, the actuator condition corresponding to the operating point r2, which is the next highest-ranked operating point, is selected.

The graph shown in FIG. 4 depicts a contour plot of ΔPm corresponding to the case where the target air amount is greatly changing at the time of acceleration. In this case, the air amount uncontrollable region, which is the right side region from the line of ΔPmmax, expands than the case shown in FIG. 3. In the figure, five operating points from r1 to r5 are shown. In this case too, the highest-ranked operating point r1 is within the air amount uncontrollable region. Further, the next highest-ranked operating point r2 is also within the air amount uncontrollable region. Therefore, in this ease, the actuator condition corresponding to the operating point r3, which is the 3rd-ranked operating point, is selected. In this manner, according to the present control device, even when the air amount uncontrollable region expands, the best actuator condition in a region where intake air amount control is possible is automatically selected.

The graph shown in FIG. 5 depicts a contour plot of ΔPm corresponding to the case where an engine speed is low and an air amount is increasing. Since scavenging of cylinders occurs at the time of a low engine speed, the left side region from the line of ΔPmmax becomes the air amount uncontrollable region. In the figure, three operating points from r1 to r3 are shown. The operating points r1 and r2 are within the air amount uncontrollable region. Therefore, in this case, the actuator condition corresponding to the operating point r3, which is the 3rd-ranked operating point, is selected. In this manner, according to the present control device, the best actuator condition in a region where intake air amount control is possible is automatically selected regardless of the current of the air amount uncontrollable region expands.

In the following step S106, the present control device calculates a target throttle opening from ΔPm of the actuator condition selected in step S105. The calculation of the target throttle opening is performed by use of the above-mentioned Equation 5. A throttle flow rate "mt" is calculated from ΔPm by Equation 5 and then the target throttle opening "TA(t+Δt)" in the Δt is calculated from the throttle flow rate "mt".

Then, the present control device manipulates the VVT and WGV in accordance with the actuator condition selected in step S105 (step S107). Further, the present control device manipulates the throttle in accordance with the target throttle opening calculated in step S106 in parallel therewith (step S108). By performing the intake air amount control in the above-described procedure, excessive operations of the VVT and WGV are limited and thereby the amount of change in the intake pipe pressure which is required to achieve the target intake air amount is confined within a range where the throttle is operable. Thus, the present control device makes it possible to control accurately an intake air amount by the throttle.

Second Embodiment

Next, a second embodiment of the present invention will now be described with reference to the accompanying drawings.

Figure 6:
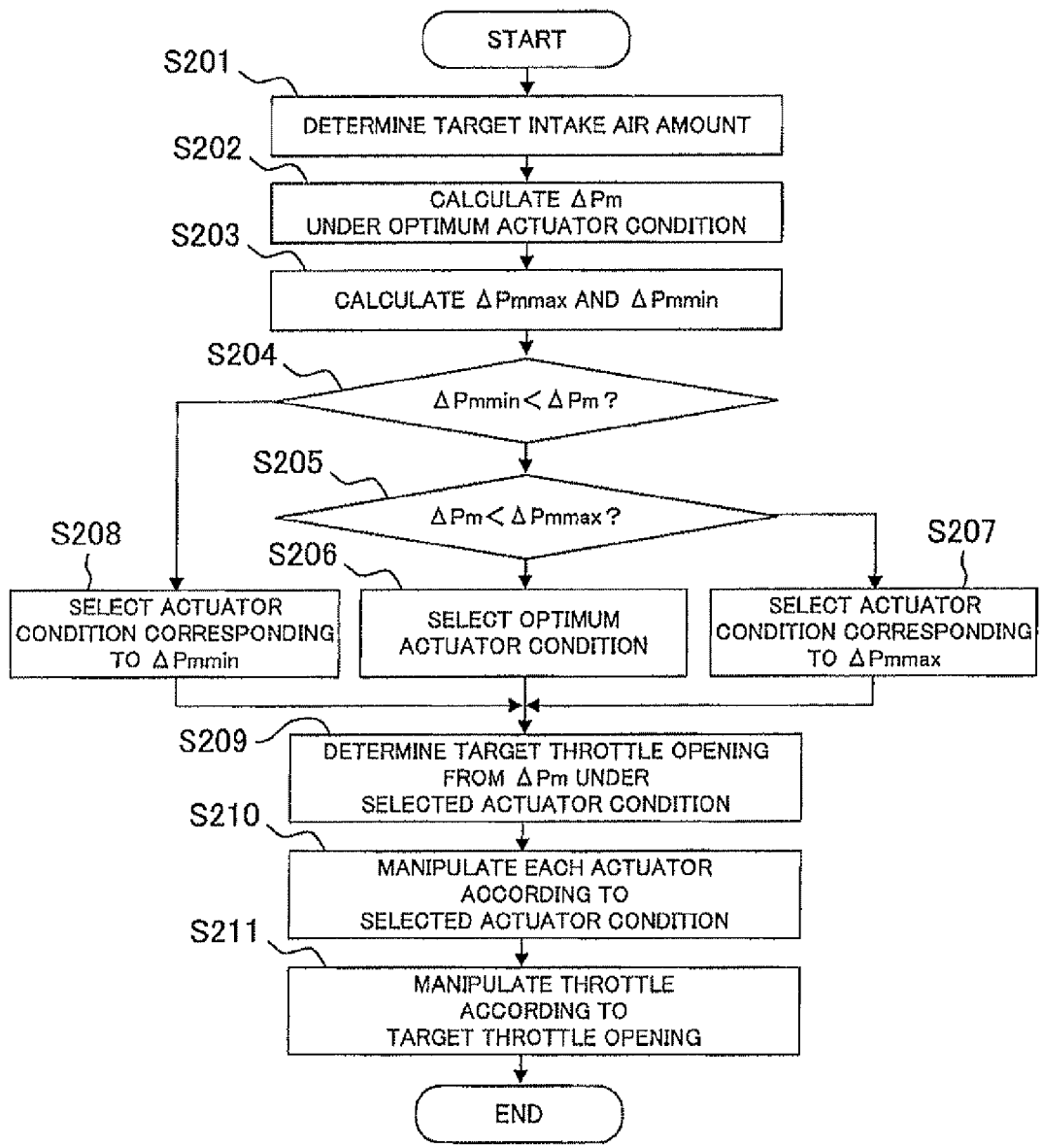
FIG. 6 is a flowchart showing a procedure of an intake air amount control executed by a control device in a second embodiment of the present invention.

FIG. 6 is a flowchart showing a procedure of an intake air amount control executed by a control device in the present embodiment. The procedure of the intake air amount control executed by the present control device will now be described with reference to the flowchart in FIG. 6 as follows.

First, in step S201, the present control device determines a target intake air amount in the Δt according to a load required for the internal combustion engine.

In the following step S202, the present control device calculates an amount "ΔPm" of change in an intake pipe pressure that is required to achieve the target intake air amount under an optimum actuator condition. The optimum actuator condition is a combination of the command values for the VVT and WGV that is most suitable from the viewpoint of fuel economy performance, exhaust gas performance, and drivability, and corresponds to the highest-ranked actuator condition in the first embodiment. The present control device prepares in advance optimum actuator conditions for each operational condition of the internal combustion engine. Calculation of the amount "ΔPm" of change in the intake pipe pressure is performed with by use of Equation 1 and Equation 2 as with the first embodiment.

In the following step S203, the present control device calculates a maximum amount "ΔPmmax" of increase in the intake pipe pressure in the Δt that is achieved when the throttle is manipulated to an opening side at a maximum speed and calculates a maximum amount "ΔPmmin" of decrease in the intake pipe pressure in the Δt that is achieved when the throttle is manipulated to the closing side at a maximum speed. These calculations are performed by use of Equation 5 as with the first embodiment.

In the following step S204, the present control device determines whether or not the amount "ΔPm" of change in the intake pipe pressure under the optimum actuator condition is larger than the maximum amount "ΔPmmin" of decrease as a lower limit. When the amount "ΔPm" of change in the intake pipe pressure is larger than the maximum amount "ΔPmmin" of decrease, then the present control device determines whether or not the amount "ΔPm" of change in the intake pipe pressure is smaller than the maximum amount "ΔPmmax" of increase as an upper limit next (step S205). When it is proved that the amount "ΔPm" of change in the intake pipe pressure satisfies the conditional equation "ΔPmmin<ΔPm<ΔPmmax", the present control device selects the optimum actuator condition as a final actuator condition (step S206).

On the other hand, when the amount "ΔPm" of change in the intake pipe pressure is not smaller than the maximum amount "ΔPmmax" of increase, the present control device calculates an actuator condition corresponding to the maximum amount "ΔPmmax" of increase in accordance with a predetermined logic and selects it as the final actuator condition (step S207). When the amount "ΔPm" of change in the intake pipe pressure is not larger than the maximum amount "ΔPmmin" of decrease, the present control device calculates an actuator condition corresponding to the maximum amount "ΔPmmin" of decrease in accordance with a predetermined logic and selects it as the final actuator condition (step S208).

Figure 7:
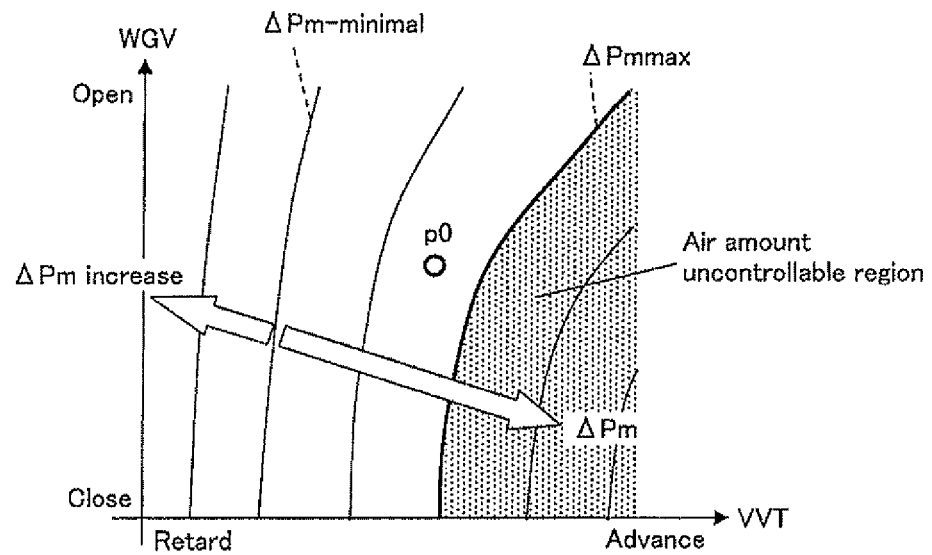
FIG. 7 is a diagram explaining a method of selecting an actuator condition in the second embodiment of the present invention.
Figure 8:
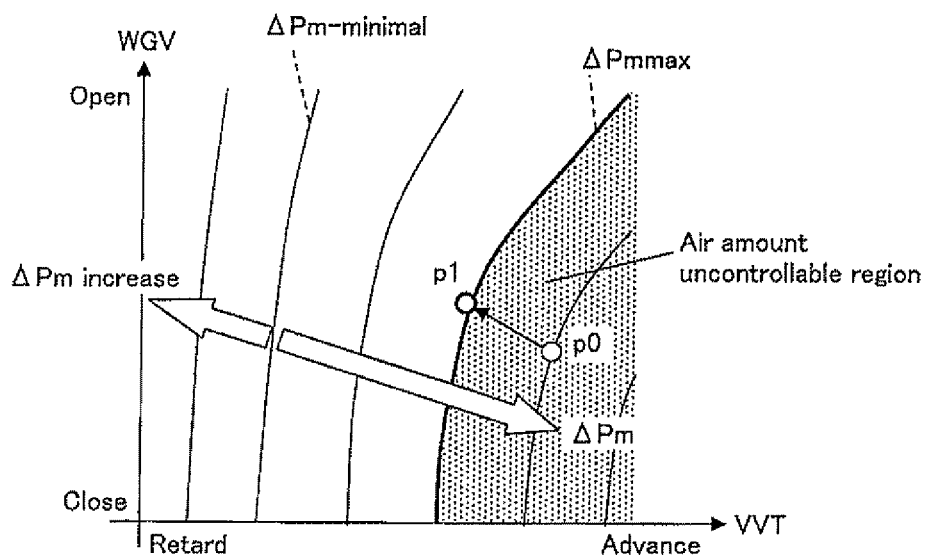
FIG. 8 is a diagram explaining a method of selecting an actuator condition in the second embodiment of the present invention.

Here, a method of selecting an actuator condition by the present control device will now be explained with drawings. Each graph shown in FIGS. 7 and 8 is a contour plot of ΔPm where the vertical axis shows a command value of the WGV and the horizontal axis shows a command value of the VVT. Each graph depicts a contour plot of ΔPm at the time of acceleration. A plurality of white circles shown in the graph are operating points corresponding to the respective actuator conditions.

In the graph shown in FIG. 7, the operating point p0 represents an operating point corresponding to the optimum actuator condition. In this case, the operating point p0 is not within the air amount uncontrollable region. Therefore, the actuator condition corresponding to the operating point p0, which is the optimum actuator condition, is selected as the final actuator condition.

On the other hand, in the graph shown in FIG. 8, because the operating point p0 is within the air amount uncontrollable region, it is not possible to select the optimum actuator condition. In this case, the operating point on the line of ΔPmmax that is the closest to the operating point p0 is calculated. The said operating point is the operating point p1 in the figure. In addition, the line of ΔPmmax can be identified by determining the values of the VVT providing ΔPmmax while changing the value of the WGV. The present control device prepares in advance a map of the relationship between the values of the WGV and VVT where ΔPmmax is provided and calculates the operating point p1 on the line of ΔPmmax by use of the data of the map. In this case, the actuator condition corresponding to the operating point p1 is selected as the final actuator condition. Selecting the actuator condition corresponding to ΔPmmax has an advantage of making the throttle operate to the operational limitation.

In the following step S209, the present control device calculates a target throttle opening from ΔPm under the actuator condition selected in any one of step S206, 207, and S208. The calculation of the target throttle opening is performed by use of the above-mentioned Equation 5. A throttle flow rate "mt" is calculated from ΔPm by Equation 5 and then the target throttle opening "TA(t+Δt)" in the Δt is calculated from the throttle flow rate "mt".

Then, the present control device manipulates the VVT and WGV in accordance with the actuator condition selected in any one of step S206, S207, and S208 (step S210). Further, the present control device manipulates the throttle in accordance with the target throttle opening calculated in step S209 in parallel therewith (step S211). By performing the intake air amount control in the above-described procedure, excessive operations of the VVT and WGV are limited and thereby the amount of change in the intake pipe pressure which is required to achieve the target intake air amount is confined within a range where the throttle is operable. In addition, according to the present control device, there is an advantage that it is possible to select the best actuator condition automatically without preparing a plurality of candidates as in the first embodiment.

Miscellaneous

The present invention is not limited to the aforementioned embodiments, and can be carried out by being variously modified in the range without departing from the gist of the present invention. For example, in the second embodiment, it is possible to add a constraint for determining the operating point on the line of ΔPmmax. In this case, operational limitations of actuators can be used as the constraint. For example, closing the WGV fully during acceleration and opening the WGV fully during deceleration are allowed in order to improve the response of the intake air amount.

Further, in the above-described embodiment, the internal combustion engine including the VVT and WGV has been exemplified, but the present invention is also applicable to an internal combustion engine including other actuators. The number and type of the actuator is not limited as long as the operating state thereof affects a relationship between an intake pipe pressure and an intake air amount.

The invention claimed is:

1. A control device for an internal combustion engine with a turbocharger including a throttle that is disposed in an intake passage, a variable valve timing mechanism that changes a valve timing of an intake valve, and a waste gate valve, the control device comprising:

target intake air amount determining means that determines a target intake air amount in a predetermined time step;

intake pipe pressure limit change amount calculating means that calculates, by use of a relational expression established between a throttle flow rate being a flow rate of air passing through the throttle, an intake valve flow rate being a flow rate of air passing through an intake valve, and an amount of change in an intake pipe pressure and a relational expression established between an opening of the throttle and a throttle flow rate, a maximum amount of increase in an intake pipe pressure in the predetermined time step achieved by manipulating the throttle to an opening side at a maximum speed and a maximum amount of decrease in an intake pipe pressure in the predetermined time step achieved by manipulating the throttle to an closing side at a maximum speed from a current intake pipe pressure and a current intake valve flow rate;

actuator command value determining means that determines, by use of a relational expression established between an intake pipe pressure, an intake valve flow rate, and respective operating states of the variable valve timing mechanism and the waste gate valve and a relational expression established between an intake valve flow rate and an intake air amount, a command value for each of the variable valve timing mechanism and the waste gate valve sb that an amount of change in an intake pipe pressure in the predetermined time step required to achieve the target intake air amount falls within a range from the maximum amount of decrease to the maximum amount of increase; and target throttle opening calculating means that calculates a target opening for the throttle for a purpose of achieving the target intake air amount under the determined actuator command value.

2. The control device for an internal combustion engine with a turbocharger according to claim 1, wherein the actuator command value determining means prepares in advance a plurality of command value candidates for each operational condition of the internal combustion engine and selects the actuator command value to be determined from the plurality of command value candidates.

3. The control device for an internal combustion engine with a turbocharger according to claim 1, wherein the actuator command value determining means prepares in advance an optimum command value for each operational condition of the internal combustion engine, sets the optimum command value as the actuator command value when an amount of change in an intake pipe pressure realized with the optimum command value is within the range from the maximum amount of decrease to the maximum amount of increase, sets a value specified with the maximum amount of decrease as the actuator command value when the amount of change in an intake pipe pressure realized with the optimum command value exceeds the maximum amount of decrease, and sets a value specified with the maximum amount of increase as the actuator command value when the amount of change in an intake pipe pressure realized with the optimum command value exceeds the maximum amount of increase.

* * * * *